March 31, 1925.

A. SAMUELSON

CONVEYER CONSTRUCTION FOR HEATED GLASSWARE

Filed July 29, 1922

1,531,310

INVENTOR.

ALEXANDER SAMUELSON.

BY

ATTORNEYS.

Patented Mar. 31, 1925.

1,531,310

UNITED STATES PATENT OFFICE.

ALEXANDER SAMUELSON, OF TERRE HAUTE, INDIANA, ASSIGNOR TO CHAPMAN J. ROOT, OF TERRE HAUTE, INDIANA.

CONVEYER CONSTRUCTION FOR HEATED GLASSWARE.

Application filed July 29, 1922. Serial No. 578,351.

*To all whom it may concern:*

Be it known that I, ALEXANDER SAMUELSON, a citizen of the United States, and a resident of Terre Haute, county of Vigo, and State of Indiana, have invented a certain new and useful Conveyer Construction for Heated Glassware; and I do hereby declare that the following is a full, clear, and exact description thereof, reference being had to the accompanying drawings, in which like numerals refer to like parts.

This invention relates to means for transporting heated glassware from the mold to other operating means, such as annealing ovens or lehrs.

The chief object of the invention is to provide a construction which will receive and transport heated glassware articles, such as bottles, from the blow mold to the annealing ovens or chambers, and which will not disfigure the bottom and sides of said heated glassware and will not abstract heat therefrom at an excessive rate and from a localized portion of the article.

The chief feature of the invention consists in roughening the glassware supporting and guiding surfaces of the conveying construction to reduce the surface in contact with said glassware and thereby form an air cushion between said glassware and the remaining surface, whereby the rapid transfer of heat from the glassware to the conveying and guiding means is reduced, which eliminates the production of strains in said glassware and prevents cracking thereof, or undue disfigurement of the exterior surface of said glassware.

The full nature of the invention will be understood from the accompanying drawings and the following description and claims.

Figure 1:
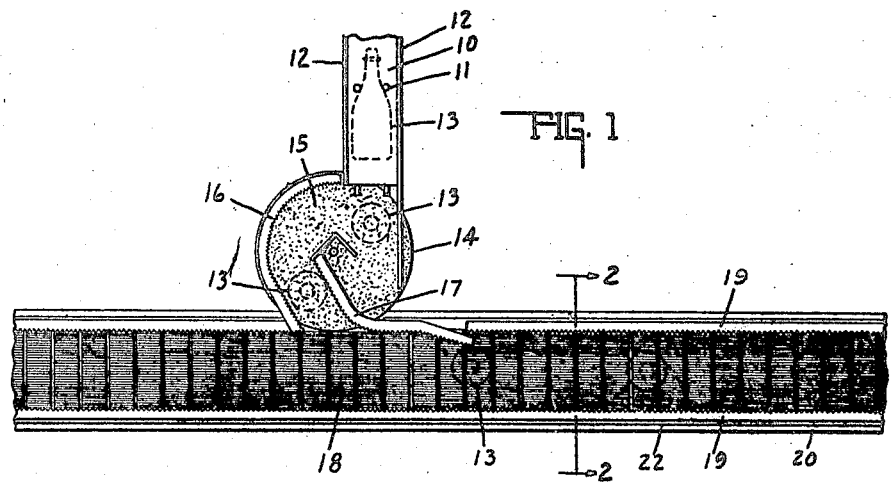
Figure 2:
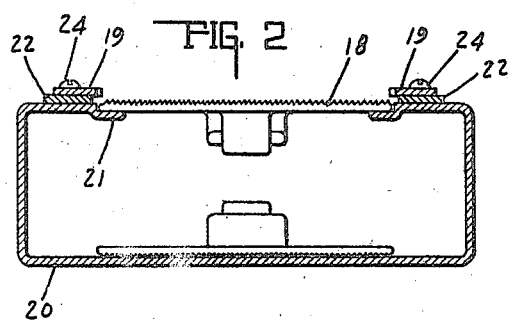
Figure 3:
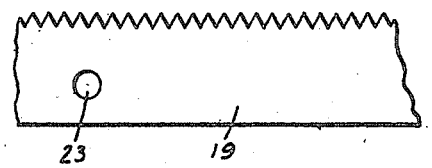
Figure 4:
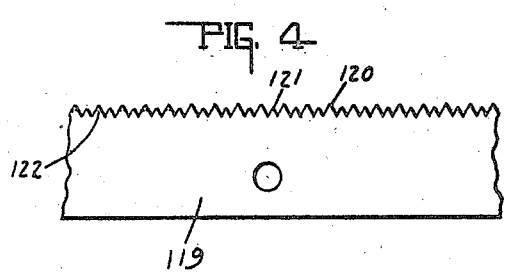
Figure 5:
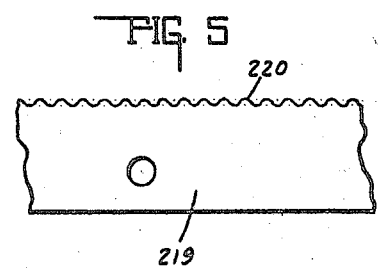
Figure 6:
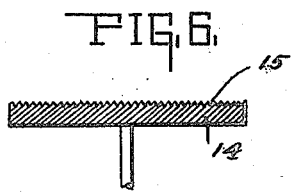

In the drawings, Fig. 1 is a plan view of the conveyer construction and articles of glassware associated therewith. Fig. 2 is an enlarged central sectional view taken on the line 2—2 of Fig. 1. Fig. 3 is an enlarged plan view of a portion of the retaining guide. Fig. 4 is a view similar to Fig. 3 of a modified form of the invention. Fig. 5 is a view similar to Figs. 3 and 4 and of another modified form of the invention. Fig. 6 is a sectional view of the surface roughened table or transferring device.

In the drawings 10 indicates an elevator provided with a glassware retaining means 11 and the guide walls 12. Positioned upon said elevator is an article of glassware, such as a bottle 13, which it is assumed is in a heated condition and it may be further assumed that said bottle has been received from the blow mold. The construction of the elevator forms no part of the present invention and any suitable or preferred form may be provided, that herein shown being substantially the same as that shown in the copending application, now patent to Hall et al., 1,480,063 January 8, 1924.

The article of glassware is presented to and received by a transferring means consisting of a rotatable member 14 having a roughened surface 15. Associated with said rotatable transferring member is a retaining guide 16, which herein is shown suitably curved so as to retain the glassware upon the rotatable transferring member 14. Another curved guide 17 is also associated with the rotatable transferring member 14 and rotational movement of the latter causes the bottle 13 to be discharged upon a conveyer construction 18.

The conveyer construction 18 is herein shown comprised of a plurality of conveyer segments or links which are suitably connected together as shown in the prior patent to Samuelson No. 1,414,212, dated April 25, 1922.

It is necessary to prevent bottles from working their way to the sides of the conveyer, and retaining guide walls 19 are provided upon each side of the supporting conveyer construction. The particular combination of the conveyer elements is old in the art and forms no part of the present invention.

The invention consists in roughening the surface of the rotatable transferring member 14 and roughening the surface of the retaining guide walls 16, 17 and 19. It has been experimentally determined that the heated glassware when projected into engagement with retaining members invariably transferred the heat to said walls and thereby produced in the glassware a localized portion which was under excessive strain, and such strains, upon the glassware reaching the desired temperature, caused the same to crack. In order to eliminate this objectionable heat transference it heretofore has been the practice to provide a cushioning element in the nature of asbestos and the like. The use of this cushioning material required replacements, and when said material became worn in certain spots, due to local weaknesses therein, the glassware thereafter was exposed to the guide walls and again subjected to excessive cooling in a localized portion. By suitably roughening the usual metallic retaining guide walls, the heated glassware could not intimately contact the same, and, therefore, an air cushion is formed between the major portion of the glassware and the guide walls.

Herein the several elements 18 are shown roughened in substantially the same manner as in my above mentioned prior Patent No. 1,414,212. Associated with said conveyer as shown in Fig. 2 is a conveyer framework 20 having the supporting ledges 21 and adapted to receive at each side a spacer 22. The spacer 22 detachably supports the guide wall 19, said guide wall being suitably apertured as at 23, see Fig. 3, to receive the retaining members 24. In Fig. 3 said roughened surface of the retaining wall 19 is shown of saw-toothed formation and is vertically serrated.

In Fig. 4 a modified form of the invention is illustrated, and herein the guide wall 119 is provided with a plurality of pairs of serrations having different heights, such as the teeth 120 and 121. When the teeth 120 become worn and rounded, as shown dotted at 122, the glassware engages not only the rounded portions but also the teeth 121.

In Fig. 5 a modified form of the invention is illustrated, and herein the guide wall 219 is provided with corrugations 220, as shown.

The failure of the relatively smooth metallic guide wall results from the extended duration of contact therewith by the heated glassware riding along the same. This contact permits the heat to be abstracted from said glassware at a localized portion thereof which causes a strain in said localized portion that subsequently results in the breakage of the glassware. A further result of such contact with the smooth surface of the conveyer is that the glassware surface becomes abrased. Both of the foregoing effects, cracking and abrasing, are substantially eliminated by the use of a roughened metallic guide wall.

The invention claimed is:

1. In a transferring and transporting construction for moving heated glassware without cracking the same, the combination of an apertured stationary retaining wall, conveying means associated with said wall, the glassware being retained thereon by the wall, a rotatable heated-glassware supporting means tangential to said conveying means at the aperture and a curved retaining guide wall associated therewith for guiding the glassware, said walls each having a roughened surface to provide air cushioning and insulation between the surface thereof and the glassware to retain heat in the latter.

2. In a transferring and transporting construction for moving heated glassware without cracking the same, the combination of an apertured stationary retaining wall, conveying means associated with said wall, the glassware being retained thereon by the wall, a rotatable heated-glassware supporting means, tangential to said conveying means at the aperture means, and a curved retaining guide wall associated therewith, for guiding the glassware, each of said walls and said rotatable supporting means having a roughened surface to provide air cushioning and insulation between the surface thereof and the glassware to retain heat in the latter.

3. In a transferring and transporting construction for moving heated glassware without cracking the same, the combination of an apertured stationary retaining wall, conveying means associated with said wall, the glassware being retained thereon by the wall, a rotatable heated-glassware supporting means, tangential to said conveying means at the aperture and a curved retaining guide wall associated therewith, for guiding the glassware, all of said walls and said conveying means having a roughened surface to provide air cushioning and insulation between the surface thereof and the glassware to retain heat in the latter.

4. In a transferring and transporting construction for moving heated glassware without cracking the same, the combination of an apertured stationary retaining wall, conveying means associated with said wall, the glassware being retained thereon by the wall, a rotatable heated-glassware supporting means, tangential to said conveying means at the aperture and a curved retaining guide wall associated therewith for guiding the glassware, said walls, said rotatable supporting means and said conveying means each having a roughened surface to provide air cushioning and insulation between the surface thereof and the glassware to retain heat in the latter.

In witness whereof, I have hereunto affixed my signature.

ALEXANDER SAMUELSON.